United States Patent [19]
Saxby

[11] 3,759,015
[45] Sept. 18, 1973

[54] POSITIVE CRANKCASE VENTILATION AIR FILTER BODY

[75] Inventor: Richard M. Saxby, Detroit, Mich.

[73] Assignee: Holley Carburetor Division, Warren, Mich.

[22] Filed: June 1, 1971

[21] Appl. No.: 148,344

[52] U.S. Cl.............. 55/350, 55/385, 55/486, 55/DIG. 19, 55/DIG. 28, 123/119 B
[51] Int. Cl............................................. F02m 35/00
[58] Field of Search............... 55/482, 483, 486, 55/487, 489, 350, 510, 509, 419, 385, DIG. 41, DIG. 31, DIG. 28; 123/136, 119 B

[56] References Cited
UNITED STATES PATENTS

| | | | |
|---|---|---|---|
| 3,115,873 | 12/1963 | Hahn et al. | 55/510 X |
| 3,263,402 | 8/1966 | Lindamood et al. | 55/510 X |
| 3,221,724 | 12/1965 | Wentworth | 55/DIG. 28 X |

Primary Examiner—Frank W. Lutter
Assistant Examiner—William Cuchlinski, Jr.
Attorney—Walter Potoroka, Sr.

[57] ABSTRACT

An air filter body has upper and lower flange portions which are respectively abutingly engaged with a downward turned lip or flange of an upper retainer plate of an associated engine air intake air cleaner assembly and with an upwardly turned lip or flange of a lower support plate of the same air cleaner assembly; the body includes a recess for carrying therein suitable filter means which is juxtaposed to the air cleaner assembly.

4 Claims, 5 Drawing Figures

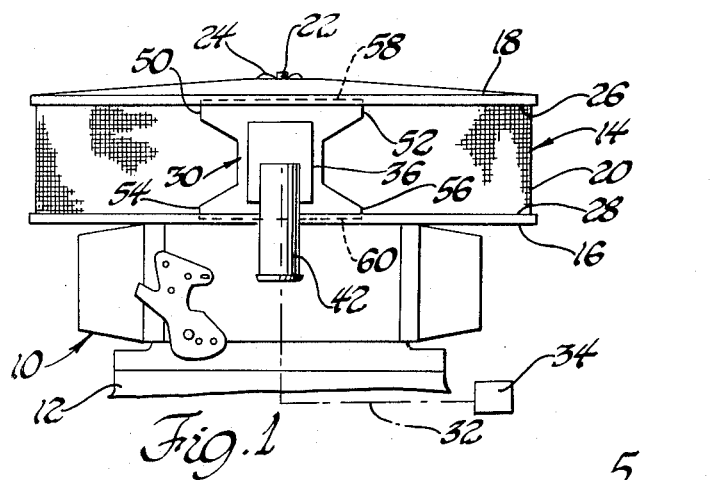
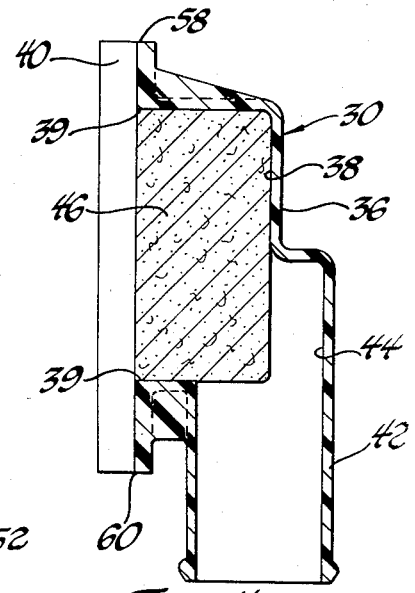
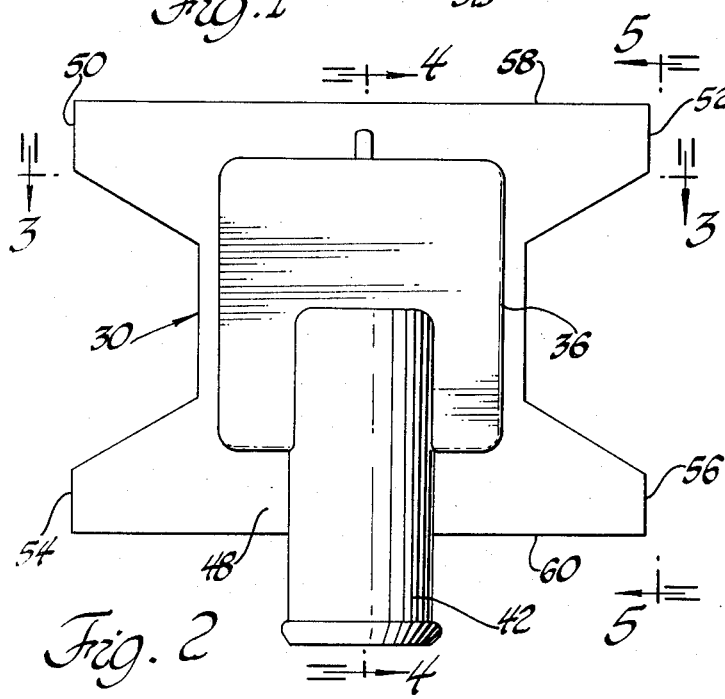
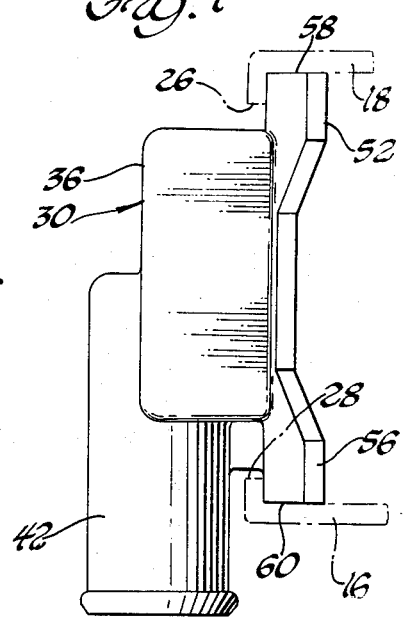
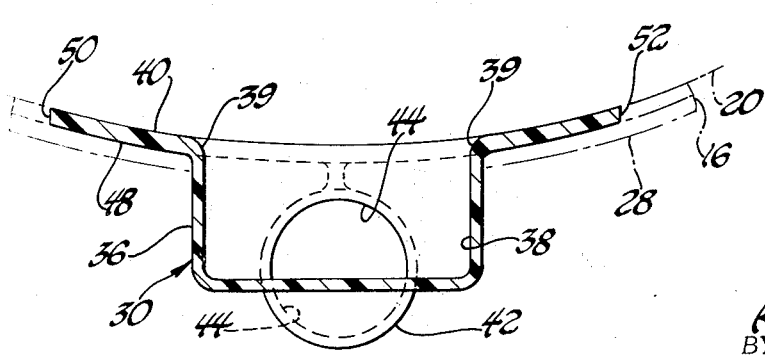

POSITIVE CRANKCASE VENTILATION AIR FILTER BODY

BACKGROUND OF THE INVENTION

It has now become accepted practice to provide for internal combustion engines, what is commonly referred to as a PCV system. Such a system is one which, through suitable conduitry and check valve means, connects the engine crankcase (at a point above the oil level therein) to the engine intake thereby preventing the venting of crankcase gases to the atmosphere and, instead, directing such gases to the engine intake or supply system for again undergoing a combustion process.

It is also standard practice, in such internal combustion engines, to provide an air cleaner assembly situated upstream of the air induction passages as formed, for example, in a carburetor. Generally, such air cleaner assemblies are comprised of a lower situated air cleaner pan (an annular plate) and an upper cover between which is situated an annular cleaner element and retained therein as by having the upper cover clamped downwardly thereon as by the coaction of an upwardly extending threaded stud carried by the carburetor and a threaded nut (often a wind unit).

It has also been the practice to have the PCV conduit means effectively extending into the interior of the air cleaner assembly as by having an aperture formed through the lower air cleaner pan with a permanently or fixedly situated pipe extending through such aperture.

Such prior art arrangements did provide some difficulty. That is, because of the physical size and configuration of the particular associated carburetor as well as other related engine controls and linkages, often there was insufficient clearance to permit the use of such a previously situated pipe extending through the lower pan of the air cleaner. Consequently, this often resulted in costly and sometimes ineffective tailoring of the particular components so as to still maintain the necessary conduitry of the PCV system.

Accordingly, the invention as herein disclosed and described is primarily concerned with the solution of the above as well as other related problems.

SUMMARY OF THE INVENTION

According to the invention, a connector for connecting conduit means conveying fumes from an engine crankcase to an air cleaner assembly associated with the air induction means of said engine comprises a main body portion, a mounting portion carried by said main body portion, said mounting portion including an arcuate mounting surface adapted to be placed in abutting relationship to an air cleaning element of said air cleaner assembly, said mounting portion further including upper and lower mounting edges adapted to be confined between and retained by opposed upper and lower annular plates comprising said air cleaner assembly, and a conduit section including passage means for completing communication between said air cleaning element and said conduit means.

DESCRIPTION OF THE DRAWINGS

In the drawings, wherein for purposes of clarity certain details and/or elements may be omitted from one or more views:

FIG. 1 is a side elevational view of a carburetor having an air cleaner assembly mounted atop thereof and employing an air filter body embodying the invention;

FIG. 2 is an enlarged view of the air filter body shown in FIG. 1;

FIG. 3 is a cross-sectional view taken generally on the plane of line 3—3 of FIG. 2 and looking in the direction of the arrows;

FIG. 4 is a vertical cross-sectional view taken generally on the plane of line 4—4 of FIG. 2 and looking in the direction of the arrows; and FIG. 5 is an elevational view taken generally on the plane of line 5—5 of FIG. 2 and looking in the direction of the arrows.

DESCRIPTION OF THE PREFERRED EMBODIMENT

Referring now in greater detail to the drawings, FIG. 1 illustrates a carburetor 10 situated atop an intake manifold 12 of an associated internal combustion engine. An air cleaner assembly 14 is shown carried atop and secured to the carburetor 10.

The air cleaner assembly 14 may be comprised of a lower annular support pan or plate 16 (commonly resting on a suitable locator formed on the top of the body of the carburetor 10) and an upper disc-like cover plate 18 with an annular air cleaner or cleaning element 20 situated therebetween. A threaded stud 22 secured to the carburetor 10 and extending upwardly therefrom projects through a clearance aperture formed in the cover plate 18 while a wing-type nut 24 threadably engaged with the stud 22 is effective, upon being tightened, to urge the cover plate 18 downwardly against the air cleaning element 20 and lower pan 16 thereby holding such in assembled relationship against the carburetor 10.

As shown also in FIGS. 3 and 5, the upper cover 18 has a downwardly depending annular lip or flange 26 while the lower base or support pan has an upwardly directed annular lip or flange 28. As seen in FIG. 3, it is accepted practice to form both the upper and lower flanges 26 and 28 to have an inner diameter somewhat larger than the outer diameter of the air cleaning element 20 thereby resulting in an annular space therebetween.

As generally illustrated in FIG. 1, the air filter body or container 30 of an associated PCV system is caused generally peripherally of the air cleaning element 20 and operatively connected as by suitable conduit means 32 to the related source of engine crankcase fumes 34.

Referring now in greater detail to the remaining Figures, it can be seen that the PCV connector 30 is comprised of a main body portion 36 having a cavity or chamber 38 formed therein and open to the rearward surface 40 which, as best seen in FIG. 3, is preferably arcuate as to conform to the outer diameter of cleaning element 20. (In some installations the cleaning element may actually have an externally situated hoop-like perforated metal guard. Accordingly, when reference is made to the surface 40 conforming to or abutting against the cleaning element 20 it is also meant that such a relationship will be achieved with respect to such an outer metal guard if, in fact, one is employed). The cavity 38 as well as the opening 39, as viewed in both FIGS. 3 and 4, may be of a generally rectangular configuration.

The body 36 also includes a downwardly depending conduit section 42 defining passage means 44 communicating with chamber 38 which is adapted to receive therein a suitable filter 46 illustrated in phantom cross-section in FIG. 4.

As best seen in FIGS. 2 and 5, the body 36 is also provided with a mounting portion 48 which includes generally laterally extending wing-like arm portions 50, 52, 54 and 56 defined at the top by an upper edge 58 and defined at the bottom by a lower edge 60.

The manner of applying or securing the PCV connector 30 to the air cleaner assembly 14 is simply as follows. First, the wing nut 24 is loosened and the air cleaner cover plate 18 is raised. Then, the lower edge 60 of the connector housing 30 is slipped into the annular channel between the outer diameter of the cleaner element 20 and the inner diameter of the flange 28 of the lower or support pan 16. (The filter element 46 is, of course, at this time carried within the chamber or cavity 38.) Next, while holding or urging the body 36 against the cleaner element 20 so as to bring surface 40 in contact therewith, the air cleaner cover 18 is lowered back into place and at the same time trapping the upper edge 58 between the outer diameter of the air cleaning element 20 and the inner diameter of the upper flange 26 of cover 18. The nut 24 is then tightened and conduit section 42 is connected, as by elastomeric conduit means 32 to the source of crankcase fumes 34.

During engine operation, the velocity of air flowing from the ambient through the cleaner element 20 and into the inwardly located carburetor induction passage is relatively high. However, in so flowing, the air must flow around both or opposite sides of the PCV connector 30 and in so doing a reduction in pressure is created in the vicinity of the opening 39 of chamber 38. Consequently a pressure differential is created across the entire PCV system causing the fumes to flow from source 34 through conduit means 32, passageway 44, filter 46 (where suspended impurities are filtered), and through the air cleaner element 20 into the carburetor induction passage.

As shoule be apparent, a major benefit of the invention is the ability of connector 30 to be placed and retained at any convenient location on the periphery of the air cleaner assembly 14 simply by loosening the nut 24 and sliding the connector 30 to whatever location is desired and then re-tightening the nut 24.

Although the invention is not so limited it, nevertheless, is preferred that the connector 30 be molded of a plastic material. It has been discovered that acetal resin, a high temperature melting point, highly crystalline, thermoplastic polymer having a chemical structure represented by the formula $(-OCH_2-)_N$ is highly suited for the forming of the connector 30. In this connection it has also been discovered that an acetal resin derived by polymerization of formaldehyde and commercially sold under the trademark, Delrin, is particularly suited. Delrin acetal resin as tested by the ASTM (American Society of Testing Materials) under standard conditions possesses the following physical properties:

| Property | ASTM No. | Value |
|---|---|---|
| Tensile strength at 75°F | D-638 | 10,000 psi |
| Flexural modulus at 73°F | D-790 | 410,000 psi |
| Specific Gravity | D-792 | 1.425 |
| Melting point (crystalline) | | 347°F |
| Coefficient of linear thermal expansion | D-696 | $4.5 \times 10^{-5}$ |
| Thermal conductivity | | 1.6 BTU/hr./sq. ft./°F/inch |

Although only one preferred embodiment of the invention has been disclosed and described it should be apparent that other embodiments and modifications of the invention are possible within the scope of the appended claims.

I claim:

1. A connector for connecting conduit means conveying fumes from an engine crankcase to an air cleaner assembly associated with the air induction means of said engine, comprising a main body portion, a mounting portion carried by said main body portion, said mounting portion including an arcuate mounting surface adapted to be placed in abutting relationship to an air cleaning element of said air cleaner assembly, said mounting portion further including upper and lower mounting edges adapted to be confined between and retained by opposed upper and lower annular plates comprising said air cleaner assembly, and a conduit section including passage means for completing communication between said air cleaning element and said conduit means.

2. A connector according to claim 1, including a chamber formed in said body portion and having an opening formed in said arcuate mounting surface, said chamber and said opening comprising a portion of said passage means, and said chamber being adapted to receive therein related filter means for filtering foreign material carried by said fumes.

3. A connector according to claim 1, wherein said mounting portion includes generally oppositely directed upper and lower wing-like portions forming a continuation of said arcuate mounting surface.

4. In combination with an air cleaner assembly, for the intake of an internal combustion engine, having a lower base plate with an annular upwardly directed flange, an upper cover plate with an annular downwardly directed flange, and an annular cleaning element situated and retained between said cover plate and said base plate and located generally within the confines of said upwardly and downwardly directed flanges, an air filter body and connector adapted for connection to a source of engine crankcase fumes, said air filter body comprising a body portion with a chamber formed therein for the reception of a filter member, said body also comprising a mounting portion with an arcuate surface closely confirming to the outer diameter of said air cleaning element, said chamber including an opening formed in said arcuate surface, said mounting portion also comprising upper and lower mounting edges, said upper mounting edge being adapted to be retained generally between the outer diameter of said air cleaning element and the inner diameter of said downwardly directed flange, said lower mounting portion being adapted to be retained generally between the outer diameter of said air cleaning element and the inner diameter of said upwardly directed flange, and conduit means formed in said body for connection to a source of engine crankcase fumes.

* * * * *